United States Patent
Tynys et al.

(10) Patent No.: US 9,206,530 B2
(45) Date of Patent: Dec. 8, 2015

(54) MELT BLOWN MEDIA FOR AIR FILTRATION

(75) Inventors: Antti Tynys, Linz (AT); Joachim Fiebig, St. Marien (AT)

(73) Assignee: BOREALIS AG, Vienna (AT)

(*) Notice: Subject to any disclaimer, the term of this patent is extended or adjusted under 35 U.S.C. 154(b) by 88 days.

(21) Appl. No.: 13/813,085

(22) PCT Filed: Jul. 29, 2011

(86) PCT No.: PCT/EP2011/063119
§ 371 (c)(1),
(2), (4) Date: Apr. 15, 2013

(87) PCT Pub. No.: WO2012/016928
PCT Pub. Date: Feb. 9, 2012

(65) Prior Publication Data
US 2013/0212993 A1    Aug. 22, 2013

(30) Foreign Application Priority Data

Aug. 2, 2010  (EP) .................................... 10171557

(51) Int. Cl.
*B01D 39/16* (2006.01)
*D01D 5/10* (2006.01)
(Continued)

(52) U.S. Cl.
CPC .............. *D01D 5/10* (2013.01); *B01D 39/1623* (2013.01); *C08F 10/06* (2013.01); *D01D 5/0985* (2013.01); *D01F 6/30* (2013.01); *D04H 1/4291* (2013.01); *D04H 1/4382* (2013.01); *Y10T 428/298* (2015.01); *Y10T 442/68* (2015.04)

(58) Field of Classification Search
CPC .. B01D 39/1623; B01D 43/23; B01D 46/521; B01D 46/528; D01D 5/10; D01D 5/985; B32B 27/08; B32B 27/36
USPC ......... 55/528, 385.1, 486–487, 500; 442/400, 442/334; 428/219, 401, 482; 96/15, 68, 74; 210/263, 433.1, 435, 483–484, 663, 210/767
See application file for complete search history.

(56) References Cited

U.S. PATENT DOCUMENTS

| | | | |
|---|---|---|---|
| 2004/0028903 A1* | 2/2004 | Richeson | 428/401 |
| 2007/0122613 A1 | 5/2007 | Stevens et al. | |

(Continued)

FOREIGN PATENT DOCUMENTS

| | | |
|---|---|---|
| WO | 2007024447 A1 | 3/2007 |
| WO | 2007045600 A1 | 4/2007 |
| WO | 2009026207 A1 | 2/2009 |

OTHER PUBLICATIONS

Tynys et al., "Propylene Polymerisations with novel heterogenous combination metallocene catalyst systems", Polymer, vol. 48, No. 7, Mar. 15, 2007.

(Continued)

*Primary Examiner* — Robert Clemente
*Assistant Examiner* — Karla Hawkins
(74) *Attorney, Agent, or Firm* — Tarolli, Sundheim, Covell & Tummino LLP

(57) ABSTRACT

Melt-blown fiber (MBF) comprising a propylene copolymer (PP), wherein the melt-blown fiber (MBF) and/or the propylene copolymer (PP) has/have (a) a melt flow rate $MFR_2$ (230° C.) measured according to ISO 1133 of at least 300 g/10 min, (b) a comonomer content of 1.5 to 6.0 wt.-%, the comonomers are ethylene and/or at least one $C_4$ to $C_{12}$ α-olefin, (c) <2,1> regiodefects of more than 0.4 mol.-% determined by $^{13}$C-NMR spectroscopy.

12 Claims, 2 Drawing Sheets

Hydrohead values for 10 gsm webs

(51) Int. Cl.
  *D01D 5/098*  (2006.01)
  *D01F 6/30*  (2006.01)
  *D04H 1/4291*  (2012.01)
  *D04H 1/4382*  (2012.01)
  *C08F 10/06*  (2006.01)

(56) References Cited

U.S. PATENT DOCUMENTS

2009/0053959 A1* 2/2009 Datta et al. ............. 442/328
2012/0107630 A1* 5/2012 Krishnaswamy et al. .... 428/482

OTHER PUBLICATIONS

European Search Report Dated Nov. 12, 2010.
Hoyos, Mario, et al., "Effect of microstructure on the thermo-oxidation of solid isotactic polypropylene-based polyolefins", Sci. Technol. Adv. Mater 9 (2008) 024404 (13 pp).
De Rosa, Claudio, et al., Tailoring the Physical Properties of Isotactic Polypropylene through Incorporation of Comonomers and the Precise . . . Mater. 2007, 19, 5122-5130.
Chinese Office Action dated Aug. 27, 2014.

* cited by examiner

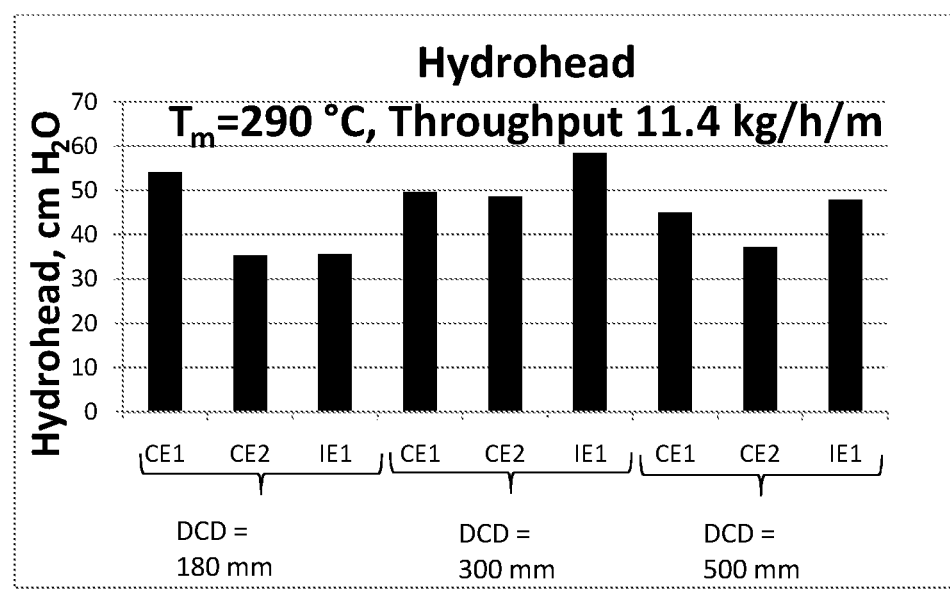
Figure 1:   Hydrohead values for 10 gsm webs

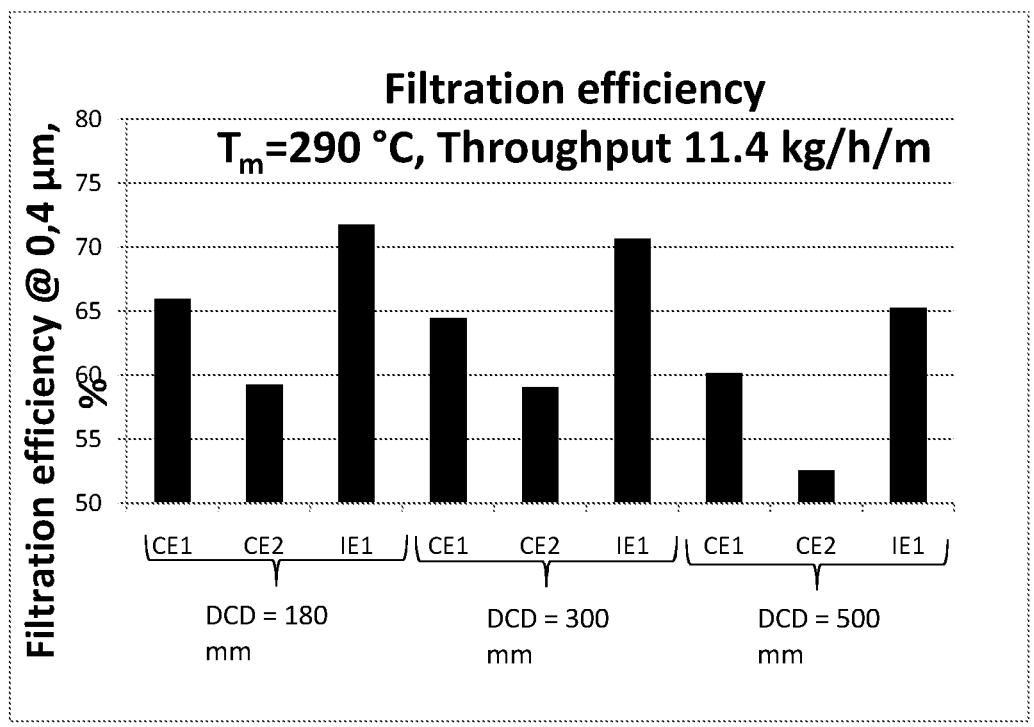
Figure 2.   Filtration values for 120 gsm webs

MELT BLOWN MEDIA FOR AIR FILTRATION

RELATED APPLICATION

This application is a National Phase Filing of PCT/EP2011/063119, filed Jul. 29, 2011, which claims priority from European Application No. 10171557.1, filed Aug. 2, 2010, the subject matter of which are incorporated herein by reference in their entirety.

The present invention is directed to a new melt blown web based on melt blown fibers comprising a propylene copolymer and to articles, in particular filtration media, made there from.

A melt blown web, being a non-woven structure consisting of melt blown fibers, is typically made in a one-step process in which high-velocity air blows a molten thermoplastic resin from an extruder die tip onto a conveyor or take-up screen to form fine fibered self-bonding web. Although many types of polymers can be employed for melt blown fibers and fabrics, polypropylene is one of the most commonly used polymers. Normally for the manufacture of melt blown fibers and webs very low viscosity polypropylene homopolymers are used. However such polymers suffer from limited mechanical strength. To overcome this problem spunbonded fabrics are produced. The polypropylene fibers of the spunbonded fabrics are much thicker compared to melt blown fibers and thus the overall weight of a spunbonded fabric is much higher compared to a melt blown web. A further characterizing and distinguishing feature of melt blown webs are their excellent water barrier and filtration properties not achievable with spunbonded fabrics.

However even though the conventional melt-blown web is the material of choice for filtration media its filtration efficiency needs to be still improved.

Thus the object of the present invention is to provide a fiber and/or a non-woven web which enables a person skilled in the art to produce an filtration media with enhanced filtration efficiency. Preferably said enhanced filtration efficiency is not paid with loss in hydrohead.

The finding of the present invention is to provide a melt blown fiber (MBF) and/or melt blown web (MBW) based on a propylene copolymer (PP) with rather high comonomer content produced in the presence of a single-site catalyst, i.e. featured by a significant amount of <2,1> regiodefects. Preferably the melt blown fiber (MBF) and/or the propylene copolymer (PP) is/are featured by low crystallization speed.

Thus the present invention is directed to a melt-blown fiber (MBF) comprising a propylene copolymer (PP), wherein the melt-blown fiber (MBF) and/or the propylene copolymer (PP) has/have (a) a melt flow rate $MFR_2$ (230° C.) measured according to ISO 1133 of at least 300 g/10 min,
(b) a comonomer content of 1.5 to 6.0 wt.-%, the comonomers being ethylene and/or at least one $C_4$ to $C_{12}$ α-olefin,
(c) <2,1> regiodefects of more than 0.4 mol.-% determined by $^{13}C$-spectroscopy.

It is especially preferred that the melt-blown fiber (MBF) and/or the propylene copolymer (PP) has/have a crystallization half-time in isothermal crystallization at 120° C. determined by DSC of at least 10 min. It is furthermore preferred that the melt-blown fiber (MBF) and/or the propylene copolymer (PP) has/have a crystallization temperature as determined in non-isothermal DSC according to ISO 3146 with a cooling rate of $10 K \cdot min^{-1}$ of less than 115° C.

Surprisingly it has been found out that such a melt-blown fiber (MBF) and/or the web (MBW) made thereof has/have much better filtration efficiency compared to known melt-blown fibers and webs, respectively.

BRIEF DESCRIPTION OF THE DRAWINGS

FIG. 1 illustrates Hydrohead values for 10 gsm webs.
FIG. 2 illustrates filtration values for 120 gsm webs.
In the following the melt-blown fibers (MBF) according to the instant invention is defined in more detail.

One essential requirement is that the inventive fiber is a melt-blown fiber (MBF). Melt-blown fibers differ essentially from other fibers, in particular from those produced by spunbond technique. In the melt blowing process a gas stream of high velocity impinges on the molten polymer stream as the polymer extrudes from small capillary in the melt blowing die and rapidly attenuates the polymer filament from about 500 µm diameter at the capillary down to diameters below 5.0 µm, like down to diameters below 3.0 µm. This corresponds to a reduction of 500 times in fiber diameter and 2,500,000 times in cross sectional area. The process occurs in about 200 microseconds over a distance of a few centimeters. This amounts to 6 times more surface area and 36 times more fiber in a melt blown web of 1 to 3 µm compared to an equivalent fiber web produced by carded or spunbond technique. Thus the principal advantage of the melt blown process is that one can make very fine fibers and very lightweight melt blown webs with excellent uniformity. The result is a soft melt blown web with excellent barrier properties, meaning effective filtration characteristics and resistance to penetration by aqueous liquids. In other words the process features "melt blown" distinguishes such produced fibers from fibers produced by different technology. More precisely "melt blown fibers" are very thin having diameters not accomplished with other fiber processes. Further webs made out of such melt blown fibers are softer and have lower weight compared to webs of the same thickness but produced by other technologies, like the spunbond process.

Accordingly the melt-blown fiber (MBF) according to the present invention preferably has an (average) diameter measured of not more than 5.0 µm, like below 5.0 µm, more preferably of not more than 3.0 µm. It is in particular appreciated that the (average) diameter of the melt-blown fiber (MBF) is in the range of 0.1 to 5.0 µm, like 0.1 to below 5.0 µm, more preferably in the range of 0.3 to 4.9 µm, yet more preferably in the range of 0.4 to 3.0 µm, like 0.5 to 3.0 µm.

A further requirement of the present invention is that the melt-blown fiber (MBF) comprises a propylene copolymer (PP). Preferably the melt-blown fiber (MBF) comprises at least 85 wt.-%, more preferably at least 90 wt.-%, like at least 95 wt.-%, of the propylene copolymer (PP). Accordingly it is in particular appreciated that the melt-blown fiber (MBF) may comprise in addition to the propylene copolymer (PP) typical additives, like antioxidants stabilizers, fillers, colorants, nucleating agents and mold release agents. Primary and secondary antioxidants include, for example, hindered phenols, hindered amines, and phosphates. Nucleating agents include, for example, sodium benzoate, sorbitol derivatives like bis-(3,4-dimethylbenzylidene)s-orbitol and nonitol derivatives like 1,2,3-trideoxy-4,6:5,7-bis-O[(4-propylphenyl)methylene]-nonitol. Other additives such as dispersing agents like glycerol monostearate can also be included. Slip agents include, for example, oleamide and erucamide. Catalyst deactivators are also commonly used, for example, calcium stearate, hydrotalcite, and calcium oxide, and/or other acid neutralizers known in the art. The amount of such additives however shall preferably not exceed 10 wt.-%, more preferably not more than 5 wt.-%, base on the melt-blown fiber (MBF) and/or web (MBW) comprising the melt blown fiber (MBF). Accordingly in a specific embodiment the melt-blown fiber (MBF) and/or the web (MBW) comprising the melt-blown fiber (MBF) may contain additives, in particular those as stated in this paragraph, but no other polymers. Thus it is preferred that the propylene copolymer (PP) is the only polymer within the melt-blown fiber (MBF) and/or web (MBW) comprising the melt-blown fiber (MBF).

In the following the propylene copolymer (PP) is described in more detail.

A "comonomer" according to this invention is a polymerizable unit different to propylene. Accordingly the propylene copolymer (PP) according to this invention shall have a comonomer content of 1.5 to 6.0 wt.-%, preferably of 2.0 to 5.5 wt.-%, more preferably of 2.5 to 5.0 wt.-%, yet more preferably of 3.0 to 4.5 wt.-%. The remaining part constitutes units derivable from propylene. Accordingly the propylene content in the propylene copolymer (PP) is preferably at least 94.0 wt.-%, more preferably at least 94.5 wt.-%, yet more preferably in the range of 94.0 to 98.5 wt.-%, still more preferably 94.5 to 98.0 wt.-%, still yet more preferably 95.0 to 97.5 wt.-%, like 95.5 to 97.0 wt.-%.

The comonomers of the propylene copolymer (PP) are ethylene and/or at least one $C_4$ to $C_{12}$ α-olefins, more preferably the comonomers of the propylene copolymer (PP) are selected from the group consisting of ethylene, $C_4$ α-olefin, $C_5$ α-olefin, $C_6$ α-olefin, $C_7$ α-olefin, $C_8$ α-olefin, $C_9$ α-olefin, and $C_{10}$ α-olefin, still more preferably the comonomers of the propylene copolymer (PP) are selected from the group consisting of ethylene, 1-butene, 1-pentene, 1-hexene, 1-heptene, 1-octene, 1-nonene and 1-decene, wherein ethylene, 1-butene and 1-hexene are preferred. The propylene copolymer (PP) may contain more than one type of comonomer. Thus the propylene copolymer (PP) of the present invention may contain one, two or three different comonomers. However it is preferred that the propylene copolymer (PP) contains only one type of comonomer. Preferably the propylene copolymer (PP) comprises—apart from propylene—only ethylene, 1-butene, or 1-hexene. In an especially preferred embodiment the comonomer of the propylene copolymer (PP) is only ethylene.

Thus the propylene copolymer (PP) is in one preferred embodiment a propylene copolymer (PP) of propylene and ethylene only, wherein the ethylene content is in the range of 1.5 to 6.0 wt.-%, preferably of 2.0 to 5.5 wt.-%, more preferably of 2.5 to 5.0 wt.-%, yet more preferably of 3.0 to 4.5 wt.-%.

In another preferred embodiment the propylene copolymer (PP) is a terpolymer of propylene, ethylene and one α-olefin being selected from the group consisting of 1-butene, 1-pentene, 1-hexene, 1-heptene, 1-octene, 1-nonene and 1-decene, wherein the total comonomer content is in the range of 1.5 to 6.0 wt.-%, preferably of 2.0 to 5.5 wt.-%, more preferably of 2.5 to 5.0 wt.-%, yet more preferably of 3.0 to 4.5 wt.-%.

Further it is appreciated that the xylene cold soluble content (XCS) of the propylene copolymer (PP) is a rather low. Accordingly the propylene copolymer (PP) has preferably a xylene cold soluble fraction (XCS) measured according to ISO 6427 (23° C.) of not more than 6.0 wt-%, more preferably of not more than 4.5 wt.-%, yet more preferably in the range of 0.8 to 6.0 wt.-%, still more preferably in the range of 1.0 to 5.0 wt.-%, still yet more preferably in the range of 1.2 to 4.0 wt.-%, like in the range of 1.3 to 3.5 wt.-%, like 1.5 to 3.5 wt.-%.

A further characteristic of the propylene copolymer (PP) is that it is produced by a single-site catalyst. Polypropylenes produced by single-site catalyst are inter alia featured by a rather high amount of missinsertions of propylene within the polymer chain. Accordingly the propylene copolymer (PP) is featured by high amount of <2,1> regiodefects, i.e. of more than 0.4 mol.-%, more preferably of equal or more than 0.6 mol.-%, like in the range of 0.5 to 1.5 mol.-%, determined by $^{13}$C-NMR spectroscopy.

A further mandatory requirement of the propylene copolymer (PP) is its rather high melt flow rate, which differ(s) form other polymers and/or fibers obtained by spunbond technique. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, it is preferred that in the present invention the propylene copolymer (PP) has an $MFR_2$ (230° C.) of at least 300 g/10 min, more preferably of at least 400 g/10 min, still more preferably in the range of in a range of 300 to 3,000 g/10 min, yet more preferably in the range of 400 to 2,000 g/10 min, still yet more preferably in the range of 400 to 1,600 g/10 min.

The weight average molecular weight (Mw) is the first moment of a plot of the weight of polymer in each molecular weight range against molecular weight. The weight average molecular weight (Mw) is very sensitive to changes in number of large molecules in a given sample of a polymer. Thus it is preferred that the weight average molecular weight (Mw) measured by SEC according to ISO 16014 of the propylene copolymer (PP) is equal or below 95,000 g/mol, more preferably equal or below 85,000 g/mol, still more preferably equal or below 80,000 g/mol. On the other hand the weight average molecular weight (Mw) of the propylene copolymer (PP) should be not too low. Thus it is especially preferred that the weight average molecular weight (Mw) is in the range of 20,000 g/mol to equal or below 95,000 g/mol, more preferably in the range of 30,000 to equal or below 90,000 g/mol, yet more preferably in the range of 35,000 to equal or below 85,000 g/mol.

Further it is appreciated that the propylene copolymer (PP) has a rather narrow molecular weight distribution (MWD). Accordingly the propylene copolymer (PP) has a molecular weight distribution (MWD) measured by size exclusion chromatography (SEC) according to ISO 16014 of not more than 5.0, more preferably not more than 4.0, yet more preferably not more than 3.5, still more preferably in the range of 1.3 to 4.0, still yet more preferably in the range of 1.5 to 3.5.

One possibility to obtain a propylene copolymer (PP) having such high melt flow rates and a rather narrow molecular weight distribution (MWD) as indicated above is visbreaking. However in the present case it is preferred to produce the propylene copolymer (PP) without visbreaking, i.e. using in the polymerization of the propylene copolymer (PP) a single site catalyst. One advantage of such polymer material is that no peroxide is needed for the degradation. The exact description as to how the propylene copolymer (PP) can be obtained is given below.

As stated above, especially good filtration efficiency is obtained in case the crystallization speed is moderate. Accordingly it is especially appreciated that the propylene copolymer (PP) has a crystallization half-time in isothermal crystallization at 120° C. determined by DSC of at least 10 min, more preferably of at least 15 min, still more preferably of at least 18 min, yet more preferably in the range of 150 to 30 min, like in the range of 18 to 25 min.

Further it is appreciated that the propylene copolymer (PP) according to this invention has
(a) melting temperature Tm of least 118° C., more preferably in the range of 120 to 150° C., still more preferably in the range of 125 to 145° C., like in the range of 127 to 142° C., and/or
(b) a crystallization temperature Tc of equal or below than 115° C., more preferably equal or below 110° C., still more preferably equal or below 100° C.
measured by non-isothermal differential scanning calorimetry (DSC) according to ISO 3146 with a cooling rate of 10K·min$^{-1}$.

Additionally it is appreciated that the propylene copolymer (PP) has a heat of fusion (Hm) of in the range of 70 to 100 J/g, yet more preferably in the range of 72 to 95 J/g.

Preferably the random propylene copolymer (PP) is isotactic. Accordingly it is appreciated that the propylene copolymer (PP) has a rather high triad concentration, i.e. higher than 95 mol-%, more preferably higher than 97 mol-%, still more preferably higher than 98 mol-%.

Further it is appreciated that the comonomers within the propylene copolymer (PP) are randomly distributed. The randomness indicates the amount of isolated comonomer units, i.e. those which have no other comonomer units in the neighbour, compared to the total amount of comonomers in the polymer chain. In a preferred embodiment, the randomness of the propylene copolymer is at least 30%, more preferably at least 50%, even more preferably at least 60%, and still more preferably at least 65%.

According to one preferred embodiment, the propylene copolymer (PP) is the only polymer component within the melt-blown fiber (MBF). Accordingly the term "propylene copolymer" according to this invention does not encompass heterophasic systems comprising a polypropylene and dispersed therein an elastomeric component. In fact the propylene copolymer (PP) according to this invention shall preferably not be understood as a mixture of two different polymers being not miscible. The term being "not miscible" indicates polymer mixtures wherein the different polymers due to their different nature form distinguishable phases visible by high resolution microscopy, like electron microscopy or scanning force microscopy. However this does not exclude the option that the propylene copolymer (PP) is a so called bimodal or multimodal polymer. Different to non miscible polymers, bimodal or multimodal polymers comprise fractions which differ in their molecular weight distribution and/or their comonomer content distribution but nevertheless are miscible in the meaning of the invention.

The expression "multimodal" or "bimodal" used herein refers to the modality of the polymer, i.e. the form of its comonomer content distribution curve, which is the graph of the comonomer content as a function of elution temperature of the temperature rising elution fractionation (TREF) method. The temperature rising elution fractionation (TREF) technique fractionates propylene polymers according to the longest crystallizable sequences in the chain, which increases almost linearly with the elution temperature (P. Ville et al., Polymer 42 (2001) 1953-1967). Hence the higher the maximum temperature the longer are the isotactic sequences. Further the temperature rising elution fraction (TREF) technique does not strictly fractionate polypropylene according to tacticity but according to the longest crystallizable sequences in the chain. Hence the solubility of the propylene copolymer chain is influenced by the concentration and distribution of sterical defects. Insofar the temperature rising elution fraction (TREF) technique is an appropriate method to characterize the propylene copolymer in view of its comonomer distribution further.

The propylene copolymer (PP) can be produced by blending different polymer types, i.e. of comonomer content. However it is preferred that the polymer components of the propylene copolymer are produced in a sequential step process, using reactors in serial configuration and operating at different reaction conditions. As a consequence, each fraction prepared in a specific reactor will have its own comonomer content distribution.

When the distribution curves from these fractions are superimposed to obtain the comonomer content distribution curve of the final polymer, these curves may show two or more maxima or at least be distinctly broadened when compared with curves for the individual fractions. In such a case a polymer, produced in two or more serial steps, is called bimodal or multimodal, depending on the number of steps.

Accordingly the propylene copolymer (PP) according to this invention may be bimodal or multimodal but not a mixture of non-miscible polymers (polymer fractions). Thus in one embodiment the propylene copolymer (PP) is multimodal, like bimodal, in view of the comonomer content. In another preferred embodiment the propylene copolymer (PP) is unimodal in view of the comonomer distribution.

As the melt-blown fiber (MBF) is dominated by the propylene copolymer (PP) (preferably the propylene copolymer (PP) is the only polymer within the melt blown fiber (MBF) and melt blown web (MBW), respectively) the values concerning comonomer content (as well as comonomer type), xylene cold soluble content (XCS), melt flow rate (MFR$_2$), melting/crystallization behavior, weight average molecular weight (Mw), molecular weight distribution (MWD), and the amount of <2,1> regiodefects are equally applicable also for the melt-blown fiber (MBF) and melt-blown web (MBW), respectively.

The weight per unit area of the melt blown web (MBW) depend very much on the end use, however it is preferred that the melt blown web (MBW) has a weight per unit area of at least 15 g/m$^2$.

In case the melt-blown web (MBW) according to the instant invention is produced as a single layer web (e.g. for air filtration purposes) it has a weight per unit area of at least 15 g/m$^2$, more preferably of at least 20 g/m$^2$, yet more preferably in the range of 25 to 250 g/m$^2$, still more preferably in the range of 30 to 200 g/m$^2$.

In case the melt-blown web (MBW) according to the instant invention is produced as one part of a multi-layer construction like an SMS-web comprising, preferably consisting of, a spunbonded web layer, a melt-blown web layer and another spunbonded web layer (e.g. for hygienic application), the melt-blown web (MBW) has a weight per unit area of at least 1 g/m$^2$, more preferably of at least 5 g/m$^2$, yet more preferably in the range of 5 to 80 g/m$^2$, still more preferably in the range of 5 to 50 g/m$^2$.

The present invention is not only directed to the melt-blown fibers (MBF) as such but also to articles, like webs (MBW), made thereof. Accordingly the present invention claims articles selected from the group consisting of filtration medium (filter), diaper, sanitary napkin, panty liner, incontinence product for adults, protective clothing, surgical drape, surgical gown, and surgical wear, comprising a melt-blown web (MBW) comprising, preferably comprising at least 80 wt.-% of, more preferably comprising at least 95 wt.-% of, yet more preferably consisting of, the melt-blown fibers (MBF) of the present invention. The present invention is in particular directed to a filtration medium (filter) comprising a melt-blown web (MBW) comprising, preferably comprising at least 80 wt.-% of, more preferably comprising at least 95 wt.-% of, yet more preferably consisting of, the melt-blown fibers (MBF) of the present invention.

Further the present invention is directed to the use of the propylene copolymer (PP) according to the present invention for the preparation of a melt-blown fiber (MBF), a melt-blown web (MBW) or an article as defined herein.

In the following the preparation of the melt-blown fiber (MBF) and web (MBW) is described in more detail.

As mentioned above the propylene copolymer (PP) of the instant invention is preferably produced in the presence of a single-site catalyst, in particular in the presence of a metallocene catalyst, like a metallocene catalyst of formula (I)

$$R_n(Cp')_2MX_2 \qquad (I)$$

wherein

"M" is zirconium (Zr) or hafnium (Hf), each "X" is independently a monovalent anionic σ-ligand, each "Cp'" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M), "R" is a bivalent bridging group linking said organic ligands (Cp'), and "n" is 1 or 2, preferably 1.

In one specific embodiment the propylene copolymer (PP) is in particular obtainable, more preferably obtained, by a solid catalyst system comprising the metallocene of formula (I), said catalyst system has a surface of lower than 15 m²/g, still lower than 10 m²/g and most preferred lower than 5 m²/g, which is the lowest measurement limit. The surface area according to this invention is measured according to ASTM D 3663 (N₂).

Alternatively or additionally it is appreciated that said solid catalyst system has a porosity of less than 1.30 ml/g and more preferably less than 1.00 ml/g. The porosity has been measured according to ASTM 4641 (N₂). In another preferred embodiment the porosity is not detectable when determined with the method applied according to ASTM 4641 (N₂).

Furthermore said solid catalyst system typically has a mean particle size of not more than 500 μm, i.e. preferably in the range of 2 to 500 μm, more preferably 5 to 200 μm. It is in particular preferred that the mean particle size is below 80 μm, still more preferably below 70 μm. A preferred range for the mean particle size is 5 to 70 μm, or even 10 to 60 μm.

As stated above the transition metal (M) is zirconium (Zr) or hafnium (Hf), preferably zirconium (Zr).

The term "σ-ligand" is understood in the whole description in a known manner, i.e. a group bound to the metal via a sigma bond. Thus the anionic ligands "X" can independently be halogen or be selected from the group consisting of R', OR', SiR'₃, OSiR'₃, OSO₂CF₃, OCOR', SR', NR'₂ or PR'₂ group wherein R' is independently hydrogen, a linear or branched, cyclic or acyclic, $C_1$ to $C_{20}$ alkyl, $C_2$ to $C_{20}$ alkenyl, $C_2$ to $C_{20}$ alkynyl, $C_3$ to $C_{12}$ cycloalkyl, $C_6$ to $C_{20}$ aryl, $C_7$ to $C_{20}$ arylalkyl, $C_7$ to $C_{20}$ alkylaryl, $C_8$ to $C_{20}$ arylalkenyl, in which the R' group can optionally contain one or more heteroatoms belonging to groups 14 to 16. In a preferred embodiments the anionic ligands "X" are identical and either halogen, like Cl, or methyl or benzyl.

A preferred monovalent anionic ligand is halogen, in particular chlorine (Cl).

The substituted cyclopentadienyl-type ligand(s) may have one or more substituent(s) being selected from the group consisting of halogen, hydrocarbyl (e.g. $C_1$ to $C_{20}$ alkyl, $C_2$ to $C_{20}$ alkenyl, $C_2$ to $C_{20}$ alkynyl, $C_3$ to $C_{20}$ cycloalkyl, like $C_1$ to $C_{20}$ alkyl substituted $C_5$ to $C_{20}$ cycloalkyl, $C_6$ to $C_{20}$ aryl, $C_5$ to $C_{20}$ cycloalkyl substituted $C_1$ to $C_{20}$ alkyl wherein the cycloalkyl residue is substituted by $C_1$ to $C_{20}$ alkyl, $C_7$ to $C_{20}$ arylalkyl, $C_3$ to $C_{12}$ cycloalkyl which contains 1, 2, 3 or 4 heteroatom(s) in the ring moiety, $C_6$ to $C_{20}$-heteroaryl, $C_1$ to $C_{20}$-haloalkyl, —SiR"₃, —SR", —PR"₂ or —NR"₂, each R" is independently a hydrogen or hydrocarbyl (e.g. $C_1$ to $C_{20}$ alkyl, $C_1$ to $C_{20}$ alkenyl, $C_2$ to $C_{20}$ alkynyl, $C_3$ to $C_{12}$ cycloalkyl, or $C_6$ to $C_{20}$ aryl) or e.g. in case of —NR"₂, the two substituents R" can form a ring, e.g. five- or six-membered ring, together with the nitrogen atom wherein they are attached to.

Further "R" of formula (I) is preferably a bridge of 1 to 4 atoms, such atoms being independently carbon (C), silicon (Si), germanium (Ge) or oxygen (O) atom(s), whereby each of the bridge atoms may bear independently substituents, such as $C_1$ to $C_{20}$-hydrocarbyl, tri($C_1$ to $C_{20}$-alkyl)silyl, tri($C_1$ to $C_{20}$-alkyl)siloxy and more preferably "R" is a one atom bridge like e.g. —SiR'''₂—, wherein each R''' is independently $C_1$ to $C_{20}$-alkyl, $C_2$ to $C_{20}$-alkenyl, $C_2$ to $C_{20}$-alkynyl, $C_3$ to $C_{12}$ cycloalkyl, $C_6$ to $C_{20}$-aryl, alkylaryl or arylalkyl, or tri($C_1$ to $C_{20}$ alkyl)silyl-residue, such as trimethylsilyl-, or the two R''' can be part of a ring system including the Si bridging atom.

In a preferred embodiment the transition metal compound has the formula (II)

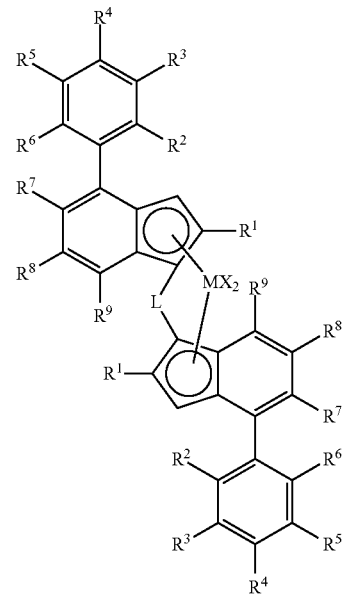

wherein

M is zirconium (Zr) or hafnium (Hf), preferably zirconium (Zr),

X are ligands with a σ-bond to the metal "M", preferably those as defined above for formula (I),
preferably chlorine (Cl) or methyl (CH₃), the former especially preferred, R¹ are equal to or different from each other, preferably equal to, and are selected from the group consisting of linear saturated $C_1$ to $C_{20}$ alkyl, linear unsaturated $C_1$ to $C_{20}$ alkyl, branched saturated $C_1$-$C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC), preferably are equal to or different from each other, preferably equal to, and are $C_1$ to $C_{10}$ linear or branched hydrocarbyl, more preferably are equal to or different from each other, preferably equal to, and are $C_1$ to $C_6$ linear or branched alkyl, $R^2$ to $R^6$ are equal to or different from each other and are selected from the group consisting of hydrogen, linear saturated $C_1$-$C_{20}$ alkyl, linear unsaturated $C_1$-$C_{20}$ alkyl, branched saturated $C_1$-$C_{20}$ alkyl, branched unsaturated $C_1$-$C_{20}$ alkyl, $C_3$-$C_{20}$ cycloalkyl, $C_6$-$C_{20}$ aryl, $C_7$-$C_{20}$ alkylaryl, and $C_7$-$C_{20}$ arylalkyl, optionally containing one or more heteroatoms of groups 14 to 16 of the Periodic Table (IUPAC), preferably are equal to or different from each other and are $C_1$ to $C_{10}$ linear or branched hydrocarbyl, more preferably are equal to or different from each other and are $C_1$ to $C_6$ linear or branched alkyl, $R^7$ and $R^8$ are equal to or different from each other and selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, optionally containing one or more heteroatoms of groups 14 to 16 of the Periodic Table (IUPAC), $SiR^{10}_3$, $GeR^{10}_3$, $OR^{10}$, $SR^{10}$ and $NR^{10}_2$, wherein $R^{10}$ is selected from the group consisting of linear saturated $C_1$-$C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC), and/or $R^7$ and $R^8$ being optionally part of a $C_4$ to $C_{20}$ carbon ring system together with the indenyl carbons to which they are attached, preferably a $C_5$ ring, optionally one carbon atom can be substituted by a nitrogen, sulfur or oxygen atom, $R^9$ are equal to or different from each other and are selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, $OR^{10}$, and $SR^{10}$, preferably $R^9$ are equal to or different from each other and are H or $CH_3$, wherein $R^{10}$ is defined as before, L is a bivalent group bridging the two indenyl ligands, preferably being a $C_2R^{11}_4$ unit or a $SiR^{11}_2$ or $GeR^{11}_2$, wherein, $R^{11}$ is selected from the group consisting of H, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl or $C_7$ to $C_{20}$ arylalkyl, optionally containing one or more heteroatoms of groups 14 to 16 of the Periodic Table (IUPAC), preferably $Si(CH_3)_2$, $SiCH_3C_6H_{11}$, or $SiPh_2$, wherein $C_6H_{11}$ is cyclohexyl.

Preferably the transition metal compound of formula (II) is $C_2$-symmetric or pseudo-$C_2$-symmetric. Concerning the definition of symmetry it is referred to Resconi et al. Chemical Reviews, 2000, Vol. 100, No. 4 1263 and references herein cited.

Preferably the residues $R^1$ are equal to or different from each other, more preferably equal, and are selected from the group consisting of linear saturated $C_1$ to $C_{10}$ alkyl, linear unsaturated $C_1$ to $C_{10}$ alkyl, branched saturated $C_1$ to $C_{10}$ alkyl, branched unsaturated $C_1$ to $C_{10}$ alkyl and $C_7$ to $C_{12}$ arylalkyl. Even more preferably the residues $R^1$ are equal to or different from each other, more preferably equal, and are selected from the group consisting of linear saturated $C_1$ to $C_6$ alkyl, linear unsaturated $C_1$ to $C_6$ alkyl, branched saturated $C_1$ to $C_6$ alkyl, branched unsaturated $C_1$ to $C_6$ alkyl and $C_7$ to $C_{10}$ arylalkyl. Yet more preferably the residues $R^1$ are equal to or different from each other, more preferably equal, and are selected from the group consisting of linear or branched $C_1$ to $C_4$ hydrocarbyl, such as for example methyl or ethyl.

Preferably the residues $R^2$ to $R^6$ are equal to or different from each other and linear saturated $C_1$ to $C_4$ alkyl or branched saturated $C_1$ to $C_4$ alkyl. Even more preferably the residues $R^2$ to $R^6$ are equal to or different from each other, more preferably equal, and are selected from the group consisting of methyl, ethyl, iso-propyl and tert-butyl.

Preferably $R^7$ and $R^8$ are equal to or different from each other and are selected from hydrogen and methyl, or they are part of a 5-methylene ring including the two indenyl ring carbons to which they are attached. In another preferred embodiment, $R^7$ is selected from $OCH_3$ and $OC_2H_5$, and $R^8$ is tert-butyl.

In a preferred embodiment the transition metal compound is rac-methyl(cyclohexyl)silanediyl bis(2-methyl-4-(4-tert-butylphenyl)indenyl)zirconium dichloride.

In a second preferred embodiment, the transition metal compound is rac-dimethylsilanediyl bis(2-methyl-4-phenyl-1,5,6,7-tetrahydro-s-indacen-1-yl)zirconium dichloride.

In a third preferred embodiment, the transition metal compound is rac-dimethylsilanediyl bis(2-methyl-4-phenyl-5-methoxy-6-tert-butylindenyl)zirconium dichloride.

Preferably said solid catalyst system comprises additionally a cocatalyst comprising an element of group 13 of the periodic table (IUPAC), for instance the cocatalyst comprises a compound of Al.

Examples of such cocatalyst are organo aluminium compounds, such as aluminoxane compounds.

Such compounds of Al, preferably aluminoxanes, can be used as the only compound in the cocatalyst or together with other cocatalyst compound(s). Thus besides or in addition to the compounds of Al, i.e. the aluminoxanes, other cation complex forming cocatalyst compounds, like boron compounds can be used. Said cocatalysts are commercially available or can be prepared according to the prior art literature. Preferably however in the manufacture of the solid catalyst system only compounds of Al as cocatalyst are employed.

In particular preferred cocatalysts are the aluminoxanes, in particular the C1 to C10-alkylaluminoxanes, most particularly methylaluminoxane (MAO).

Preferably, the organo-zirconium compound of formula (I) and the cocatalyst of the solid catalyst system represent at least 70 wt %, more preferably at least 80 wt %, even more preferably at least 90 wt %, even further preferably at least 95 wt % of the solid catalyst system. Thus it is appreciated that the solid catalyst system is featured by the fact that it is self-supported, i.e. it does not comprise any catalytically inert support material, like for instance silica, alumina or $MgCl_2$ or porous polymeric material, which is otherwise commonly used in heterogeneous catalyst systems, i.e. the catalyst is not supported on external support or carrier material. As a consequence of that the solid catalyst system is self-supported and it has a rather low surface area.

In one embodiment the solid metallocene catalyst system is obtained by the emulsion solidification technology, the basic principles of which are described in WO 03/051934. This document is herewith included in its entirety by reference.

Hence the solid catalyst system is preferably in the form of solid catalyst particles, obtainable by a process comprising the steps of
a) preparing a solution of one or more catalyst components;
b) dispersing said solution in a second solvent to form an emulsion in which said one or more catalyst components are present in the droplets of the dispersed phase,
c) solidifying said dispersed phase to convert said droplets to solid particles and optionally recovering said particles to obtain said catalyst.

Preferably a first solvent, more preferably a first organic solvent, is used to form said solution. Still more preferably the organic solvent is selected from the group consisting of a linear alkane, cyclic alkane, aromatic hydrocarbon and halogen-containing hydrocarbon.

Moreover the second solvent forming the continuous phase is an inert solvent towards to catalyst components, The second solvent might be immiscible towards the solution of the catalyst components at least under the conditions (like temperature) during the dispersing step. The term "immiscible with the catalyst solution" means that the second solvent (continuous phase) is fully immiscible or partly immiscible i.e. not fully miscible with the dispersed phase solution.

Preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$ perfluoroalkanes, -alkenes or -cycloalkanes, more preferred $C_4$-$C_{10}$ perfluoro-alkanes, -alkenes or -cycloalkanes, particularly preferred perfluorohexane, perfluoroheptane, perfluorooctane or perfluoro (methylcyclohexane) or perfluoro(1,3-dimethylcyclohexane or a mixture thereof.

Furthermore it is preferred that the emulsion comprising said continuous phase and said dispersed phase is a bi- or multiphasic system as known in the art. An emulsifier may be used for forming and stabilising the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated C1-n (suitably C4-30- or C5-15) alcohol (e.g. highly fluorinated heptanol, octanol or nonanol), oxide (e.g. propenoxide) or acrylate ester which reacts e.g. with a cocatalyst component, such as aluminoxane to form the "actual" surfactant.

In principle any solidification method can be used for forming the solid particles from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

For further details, embodiments and examples of the continuous and dispersed phase system, emulsion formation method, emulsifying agent and solidification methods reference is made e.g. to the above cited international patent application WO 03/051934.

All or part of the preparation steps can be done in a continuous manner. Reference is made to WO 2006/069733 describing principles of such a continuous or semicontinuous preparation methods of the solid catalyst types, prepared via emulsion/solidification method.

The above described catalyst components are prepared according to the methods described in WO 01/48034.

The polymerization of the propylene copolymer (PP) can be a bulk polymerization, preferably performed in a so-called loop reactor. Alternatively the polymerization of the propylene copolymer (PP) is a two stage polymerization performed in a combination of a loop reactor operating in slurry phase and a gas phase reactor as for instance applied in the Borstar polypropylene process.

Preferably, in the process for producing the propylene copolymer (PP) as defined above the conditions for the bulk reactor of step may be as follows:
  the temperature is within the range of 40° C. to 110° C., preferably between 60° C. and 100° C., 70 to 90° C.,
  the pressure is within the range of 20 bar to 80 bar, preferably between 30 bar to 60 bar,
  hydrogen can be added for controlling the molar mass in a manner known per se.

Subsequently, the reaction mixture from the bulk (bulk) reactor is transferred to the gas phase reactor, whereby the conditions are preferably as follows:
  the temperature is within the range of 50° C. to 130° C., preferably between 60° C. and 100° C.,
  the pressure is within the range of 5 bar to 50 bar, preferably between 15 bar to 35 bar,
  hydrogen can be added for controlling the molar mass in a manner known per se.

The residence time can vary in both reactor zones. In one embodiment of the process for producing the propylene copolymer (PP) the residence time in bulk reactor, e.g. loop is in the range 0.5 to 5 hours, e.g. 0.5 to 2 hours and the residence time in gas phase reactor will generally be 1 to 8 hours.

If desired, the polymerization may be effected in a known manner under supercritical conditions in the bulk, preferably loop reactor, and/or as a condensed mode in the gas phase reactor.

The thus obtained propylene copolymer (PP) is used in pellet or granule form for the melt-blown fiber process. In the process metering pumps are used to pump the molten propylene copolymer (PP) to a distribution system having a series of die tips, the propylene copolymer (PP) being in the molten state at some processing temperature. The die tip is designed in such a way that the holes are in a straight line with high-velocity air impinging from each side. A typical die will have 0.3 to 0.5 mm diameter, preferably 0.4 mm diameter, holes spaced at 10 to 16 per cm (25 to 40 per inch). The impinging high-velocity hot air attenuates the filaments and forms the desired fibers. Immediately below or adjacent to the die, a large amount of ambient air is drawn into the hot air stream containing the fibers which cools the hot gas and solidifies the fibers onto a forming belt or other solid surface that is typically moving in such a manner as to create a continually renewed surface for the fibers to contact and form a web. The processing temperature is one factor in the final web properties. The "optimal" processing temperature is one at which ideal properties of the web are achieved such as low shot with good hand and high barrier properties, or good filtration properties.

The properties of the melt-blown fiber (MBF) and/or the melt blown web (MBW) can be further improved in case the cooling of the fibers is not accomplished with ambient air but by water cooling.

Considering the information provided above, the following embodiments are in particular preferred.

[embodiment 1] Melt-blown fiber (MBF) comprising a propylene copolymer (PP), wherein the melt-blown fiber (MBF) and/or the propylene copolymer (PP) has/have
(a) a melt flow rate $MFR_2$ (230° C.) measured according to ISO 1133 of at least 300 g/10 min,
(b) a comonomer content of 1.5 to 6.0 wt.-%, the comonomers being ethylene and/or at least one $C_4$ to $C_{12}$ α-olefin,
(c) <2,1> regiodefects of more than 0.4 mol.-% determined by $^{13}C$-spectroscopy.

[embodiment 2] Melt-blown fiber (MBF) according to [embodiment 1], wherein the melt-blown fiber (MBF) has an average diameter of equal or less than 5.0 μm.

[embodiment 3] Melt-blown fiber (MBF) according to claim [embodiment 1] or [embodiment 2], wherein the melt-blown fiber (MBF) and/or the propylene copolymer (PP) has/have a crystallization half-time in isothermal crystallization at 120° C. determined by DSC of at least 10 min.

[embodiment 4] Melt-blown fiber (MBF) according to any one of the preceding [embodiments 1 to 3], wherein the melt-blown fiber (MBF) and/or the propylene copolymer (PP) has/have
(a) a weight average molecular weight (Mw) of equal or below 85,000 g/mol,
and/or
(b) a molecular weight distribution ($M_w/M_n$) of 1.3 to 4.0 measured by size exclusion chromatography (SEC) according to ISO 16014.

[embodiment 5] Melt-blown fiber (MBF) according to any one of the preceding [embodiments 1 to 4], wherein the melt-blown fiber (MBF) and/or the propylene copolymer (PP) has/have a xylene cold soluble fraction (XCS) measured according to ISO 6427 (23° C.) in the range of 1.2 to 4.0 wt.-%.

[embodiment 6] Melt-blown fiber (MBF) according to any one of the preceding [embodiments 1 to 5], wherein the melt-blown fiber (MBF) and/or the propylene copolymer (PP) has/have
(a) melting temperature Tm in the range of 125 to 145° C.,
and/or
(b) a crystallization temperature Tc of equal or below than 115° C.
measured by non-isothermal differential scanning calorimetry (DSC) with a cooling rate of 10 K·min$^{-1}$.

[embodiment 7] Melt-blown fiber (MBF) according to any one of the preceding [embodiments 1 to 6], wherein the propylene copolymer (PP)
(a) is a random propylene copolymer (R-PP),
and/or
(b) is not vis-broken.

[embodiment 8] Melt-blown fiber (MBF) according to any one of the preceding [embodiments 1 to 7], wherein
(a) the propylene copolymer (PP) is the only polymer within the melt-blown fiber (MBF),
and/or
(b) the melt-blown fiber (MBF) comprises at least 85 wt.-% of the propylene copolymer (PP).

[embodiment 9] Melt-blown web (MBW) comprising melt-blown fibers (MBF) according to any one of the preceding [embodiments 1 to 8].

[embodiment 10] Melt-blown web (MBW) according to [embodiment 9] having a weight per unit area of at least 15 g/m$^2$.

[embodiment 11] Article comprising a melt-blown fiber (MBF) according to any one of the preceding [embodiment 1 to 9] and/or a melt-blown web (MBW) according to [embodiment 9] or [embodiment 10], said article is selected from the group consisting of filtration medium, diaper, sanitary napkin, panty liner, incontinence product for adults, protective clothing, surgical drape, surgical gown, and surgical wear.

[embodiment 12] Process for the preparation of a melt-blown fibers (MBF) according to any one of the [embodiments 1 to 8], wherein a propylene copolymer (PP) as defined in any one of the [embodiment 1 to 8] has been melt blown by using a melt blown plant having a die with holes of 0.3 to 0.5 mm diameter and 10 to 16 holes per cm.

[embodiment 13] Use of a propylene copolymer (PP) as defined in any one of the [embodiments 1 to 7] for the preparation of a melt-blown fiber (MBF) as defined in any one of the [embodiments 1 to 8], a melt blown web (MBW) as defined in [embodiment 9] or [embodiment 10] or an article as defined in [embodiment 11]

The present invention will now be described in further detail by the examples provided below.

EXAMPLES

1. Definitions/Measuring Methods

The following definitions of terms and determination methods apply for the above general description of the invention as well as to the below examples unless otherwise defined.

NMR-Spectroscopy Measurements:

The $^{13}C$-NMR spectra of polypropylenes were recorded on Bruker 400 MHz spectrometer at 130° C. from samples dissolved in 1,2,4-trichlorobenzene/benzene-d6 (90/10 w/w). For the triad analysis the assignment is done according to the methods described in literature: (T. Hayashi, Y. Inoue, R. Chüjö, and T. Asakura, Polymer 29 138-43 (1988). and Chujo R, et al, Polymer 35 339 (1994).

The NMR-measurement was used for determining the mm triad concentration in a manner well known in the art.

Melting Temperature ($T_m$) and Enthalpy ($H_f$), Crystallization Temperature ($T_c$) and Enthalpy ($H_c$):

measured with a Mettler TA820 differential scanning calorimeter (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature and enthalpy ($H_c$) are determined from the cooling step, while melting temperature and melting enthalpy ($H_f$) are determined from the second heating step.

Crystallization Half-Time

The crystallization half-time is determined with a Mettler TA820 differential scanning calorimeter (DSC) on 5 to 10 mg samples. A temperature profile as follows is applied: Heating from room temperature to 210° C., retaining said temperature for 5 min to erase the crystalline history, cooling rapidly at about 100° C.·min$^{-1}$ to the crystallization temperature of 120° C. while avoiding any undershoot below said crystallization temperature, maintaining the crystallization temperature of 120° C. until the sample is fully crystallized. The peak time of the crystallization enthalpy is assumed to be the crystallization half-time.

Quantification of Microstructure by NMR Spectroscopy

Quantitative nuclear-magnetic resonance (NMR) spectroscopy was used to quantify the isotacticity, regio-regularity and comonomer content of the polymers.

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics.

For polypropylene homopolymers approximately 200 mg of material was dissolved in 1,2-tetrachloroethane-d$_2$ (TCE-d$_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromoleucles 30 (1997) 6251). Standard single-pulse excitation was employed utilising the NOE and bi-level WALTZ 16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra For ethylene-propylene copolymers approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ 16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 6144 (6 k) transients were acquired per spectra.

Quantitative $^{13}C\{^1H\}$ NMR spectra were processed, integrated and relevant quantitative properties determined from the integrals using proprietary computer programs.

For ethylene-propylene copolymers all chemical shifts were indirectly referenced to the central methylene group of the ethylene block (EEE) at 30.00 ppm using the chemical shift of the solvent. This approach allowed comparable referencing even when this structural unit was not present.

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$$P_{21e}=(I_{e6}+I_{e8})/2$$

The amount of 1,2 primary inserted propene was quantified based on the methyl region with correction undertaken for sites included in this region not related to primary insertion and for primary insertion sites excluded from this region:

$$P_{12}=I_{CH3}+P_{12e}$$

The total amount of propene was quantified as the sum of primary inserted propene and all other present regio defects:

$$P_{total}=P_{12}+P_{21e}$$

The mole percent of 2,1 erythro regio defects was quantified with respect to all propene:

[21e] mol %=100*($P_{21e}/P_{total}$)

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) correction for the influence of such defects on the comonomer content was required.

The mole fraction of ethylene in the polymer was quantified using the method of Wang et. al. (Wang, W-J., Zhu, S., Macromolecules 33 (2000), 1157) through integration of multiple signals across the whole spectral region of a $^{13}C\{^1H\}$ spectra acquired using defined conditions. This method was chosen for its accuracy, robust nature and ability to account for the presence of regio-defects when needed. Integral regions were slightly adjusted to increase applicability to a wider range of comonomer contents.

The mole percent comonomer incorporation in the polymer was calculated from the mole fraction according to:

E[mol %]=100*fE

The weight percent comonomer incorporation in the polymer was calculated from the mole fraction according to:

E[wt %]=100*(fE*28.05)/((fE*28.05)+((1−fE)*42.08))

The comonomer sequence distribution at the triad level was determined using the method of Kakugo et al. (Kakugo, M., Naito, Y., Mizunuma, K., Miyatake, T. Macromolecules 15 (1982) 1150) through integration of multiple signals across the whole spectral region of a $^{13}C\{^1H\}$ spectra acquired using defined conditions. This method was chosen for its robust nature. Integral regions were slightly adjusted to increase applicability to a wider range of comonomer contents.

The mole percent of a given comonomer triad sequence in the polymer was calculated from the mole fraction determined by the method of Kakugo et at. (Kakugo, M., Naito, Y., Mizunuma, K., Miyatake, T. Macromolecules 15 (1982) 1150) according to:

$$XXX[mol\%]=100*fXXX$$

The mole fraction comonomer incorporation in the polymer, as determined from the comonomer sequence distribution at the triad level, were calculated from the triad distribution using known necessary relationships (Randall, J. Macromol. Sci., Rev. Macromol. Chem. Phys. 1989, C29, 201):

$$fXEX=fEEE+fPEE+fPEP$$

$$fXPX=fPPP+fEPP+fEPE$$

where PEE and EPP represents the sum of the reversible sequences PEE/EEP and EPP/PPE respectively.

The randomness of the comonomer distribution was quantified as the relative amount of isolated ethylene sequences as compared to all incorporated ethylene. The randomness was calculated from the triad sequence distribution using the relationship:

$$R(E)[\%]=100*(fPEP/fXEX)$$

Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

$MFR_2$ (230° C.) is measured according to ISO 1133 (230° C., 2.16 kg load)

The Xylene Solubles (XCS, Wt.-%):

Content of Xylene solubles (XCS) is determined at 23° C. according ISO 6427.

Grammage of the Nonwoven Fabric, the Web, and the Coating Layer

The unit weight (grammage) of the webs in g/m² was determined in accordance with ISO 536:1995.

Average Fibre Diameter in the Web

The number average fibre diameter was determined using scanning electron microscopy (SEM). A representative part of the web was selected and an SEM micrograph of suitable magnification was recorded, then the diameter of 20 fibres was measured and the number average calculated.

Hydrohead

The hydrohead or water resistance as determined by a hydrostatic pressure test is determined according to the WSP (wordwide strategic partners) standard test WSP 80.6 (09) as published in December 2009. This industry standard is in turn based on ISO 811:1981 and uses specimens of 100 cm² at 23° C. with purified water as test liquid and a rate of increase of the water pressure of 10 cm/min.

Filtration Efficiency

Air filtration efficiency was determined based on EN 1822-3 for flat sheet filter media, using a test filter area of 400 cm². The particle retention was tested with an usual aerosol of di-ethyl-hexyl-sebacate (DEHS), calculating efficiency for the fraction with 0.4 µm diameter from a class analysis with 0.1 µm scale. An airflow of 16 m³·h⁻¹ was used, corresponding to an airspeed of 0.11 m·s⁻¹.

Porosity:

BET with $N_2$ gas, ASTM 4641, apparatus Micromeritics Tristar 3000; sample preparation: at a temperature of 50° C., 6 hours in vacuum.

Surface Area:

BET with $N_2$ gas ASTM D 3663, apparatus Micromeritics Tristar 3000: sample preparation at a temperature of 50° C., 6 hours in vacuum.

B. Examples

A metallocene catalyst as described in example 1 of EP 1741725 A1 was used for the preparation of the propylene polymers of both comparative and inventive examples. The polymerization was carried out as detailed below. In each case after deactivation of the catalyst with steam and drying of the resulting polymer powder with warm nitrogen, the resulting polypropylene homopolymer was compounded together with 0.07 wt % Calcium Stearate and 0.60% Irganox B225 (antioxidant combination supplied by Ciba Specialty Chemicals) in a twin screw extruder at 230 to 250° C. The characterization results of all three polymers are given in table 1.

Preparation of Comparative Example 1 (CE 1)

The propylene homopolymer of CE 1 has been produced in a Borstar PP pilot plant as follows: The catalyst was fed together with propylene at 78 kg/h into a stirred tank prepolymerization reactor together with hydrogen in a ratio of 0.6 mol/kmol propylene, the reactor being operated at 30° C. with an average residence time of 0.3 hours. The main polymerization step was carried out in a loop reactor at a temperature of 75° C. and a pressure of 5500 kPa feeding additional propylene at 206 kg/h with hydrogen in a ratio of 0.75 mol/kmol propylene, maintaining an average residence time of 1.0 hours and achieving a catalyst productivity of 9.5 kg/g.

Preparation of Comparative Example 2 (CE 2)

The propylene-ethylene random copolymer of CE 2 has been produced in a Borstar PP pilot plant as follows: The catalyst was fed together with propylene at 76 kg/h into a stirred tank prepolymerization reactor together with propylene and hydrogen in a ratio of 0.4 mol/kmol propylene, the reactor being operated at 30° C. with an average residence time of 0.35 hours. The main polymerization step was carried out in a loop reactor at a temperature of 70° C. and a pressure of 5490 kPa feeding additional propylene at 156 kg/h with ethylene in a ratio of 5 mol/kmol propylene and hydrogen in a ratio of 0.31 mol/kmol propylene, maintaining an average residence time of 0.37 hours and achieving a catalyst productivity of 10.3 kg/g.

Preparation of Inventive Example 1 (IE 1)

The propylene-ethylene random copolymer of IE 1 has been produced in a Borstar PP pilot plant as follows: The catalyst was fed together with propylene at 64.8 kg/h into a stirred tank prepolymerization reactor together with hydrogen in a ratio of 0.4 mol/kmol propylene, the reactor being operated at 25° C. with an average residence time of 0.3 hours. The main polymerization step was carried out in a loop reactor at a temperature of 75° C. and a pressure of 5400 kPa feeding additional propylene at 126 kg/h with ethylene in a ratio of 2.7 mol/mol propylene and hydrogen in a ratio of 2.16 mol/kmol propylene, maintaining an average residence time of 0.5 hours and achieving a catalyst productivity of 9.6 kg/g.

TABLE 1

Properties of the polymers

|  |  | CE 1 | CE 2 | IE 1 |
|---|---|---|---|---|
| 2,1-insertions | [mol.-%] | 0.8 | 0.6 | 0.7 |
| MFR | [g/10 min] | 710 | 660 | 890 |
| C2 | [wt.-%] | 0 | 1.0 | 3.6 |
| $M_w$ | [kg/mol] | 63 | 70 | 66 |
| MWD | [—] | 2.5 | 2.8 | 2.4 |
| Tm | [° C.] | 152 | 148 | 131 |
| $\Delta H_f$ | [J/g] | 106 | 101 | 78 |
| Tc | [° C.] | 118 | 111 | 95 |
| $\Delta H_c$ | [J/g] | 107 | 96 | 76 |
| XCS | [wt.-%] | 1.0 | 1.4 | 2.7 |
| Crystallization speed at 120° C. | [min] | 3.1 | 10.6 | 20.7 |

The polymers were tested on the Reicofil melt blown pilot line using a die with holes of 0.4 mm diameter and 35 holes per inch. The melt temperature was set at 290° C. and the air temperature at 270° C. The effect of die-to-collector-distance (DCD) on the processability, hydrohead and filtration properties was investigated. The highest applicable air volume without fly formation was used. 120 gsm webs were produced for filtration studies and 10 gsm webs for hydrohead measurements.

The hydrohead and standard deviation values measured for 10 gsm webs are shown in FIG. 1. As can be seen in FIG. 1, IE1 has moderately improved hydrohead values when higher DCD is used. With short DCD (180 mm), the hydrohead value is lower compared with the CE1 reference sample.

The filtration efficiency at particle size 0.4 μm and standard deviation values measured for 120 gsm webs are shown in FIG. 2. As illustrated in FIG. 2, IE 1 has markedly improved filtration efficiency compared with reference samples CE 1 and CE 2.

The Figures demonstrate the benefit of propylene copolymer (PP) in production of melt-blown media with markedly improved filtration efficiency. Additionally, positive effect is seen on hydrohead values, especially if high DCD is applied.

The invention claimed is:

1. Melt-blown fiber (MBF) comprising a propylene copolymer (PP), wherein:
    (a) the propylene copolymer (PP) is the only polymer within the melt-blown fiber (MBF), and
    (b) the melt-blown fiber (MBF) and/or the propylene copolymer (PP) has/have
        (b1) a melt flow rate $MFR_2$ (230° C.) measured according to ISO 1133 of at least 300 g/10 min,
        (b2) a comonomer content of 1.5 to 6.0 wt. %, the comonomers being ethylene, 1-butene, and/or 1-hexene,
        (b3) <2,1> regiodefects of more than 0.4 mol. % determined by $^{13}C$-spectroscopy, and
    (b4) a crystallization half-time in isothermal crystallization at 120° C. determined by DSC of at least 10 min.

2. Melt-blown fiber (MBF) according to claim 1, wherein the melt-blown fiber (MBF) has an average diameter of equal or less than 5.0 μm.

3. Melt-blown fiber (MBF) according to claim 1, wherein the melt-blown fiber (MBF) and/or the propylene copolymer (PP) has/have:
    (a) a weight average molecular weight (Mw) of equal or below 85,000 g/mol, and/or
    (b) a molecular weight distribution ($M_w/M_n$) of 1.3 to 4.0 measured by size exclusion chromatography (SEC) according to ISO 16014.

4. Melt-blown fiber (MBF) according to claim 1, wherein the melt-blown fiber (MBF) and/or the propylene copolymer (PP) has/have a xylene cold soluble fraction (XCS) measured according to ISO 6427 (23° C.) in the range of 1.2 to 4.0 wt. %.

5. Melt-blown fiber (MBF) according to claim 1, wherein the melt-blown fiber (MBF) and/or the propylene copolymer (PP) has/have:
    (a) a melting temperature Tm in the range of 125 to 145° C., and/or
    (b) a crystallization temperature Tc of equal or below than 115° C., measured by non-isothermal differential scanning calorimetry (DSC) with a cooling rate of 10 $K \cdot min^{-1}$.

6. Melt-blown fiber (MBF) according to claim 1, wherein the propylene copolymer (PP):
    (a) is a random propylene copolymer (R-PP), and/or
    (b) is not vis-broken.

7. Melt-blown fiber (MBF) according to claim 1, wherein the melt-blown fiber (MBF) comprises at least 85 wt. % of the propylene copolymer (PP).

8. Melt-blown web (MBW) comprising melt-blown fibers (MBF) according to claim 1.

9. Melt-blown web (MBW) according to claim 8, having a weight per unit area of at least 15 $g/m^2$.

10. Article comprising a melt-blown fiber (MBF) according to claim 1, said article is selected from the group consisting of filtration medium, diaper, sanitary napkin, panty liner, incontinence product for adults, protective clothing, surgical drape, surgical gown, and surgical wear.

11. Process for the preparation of a melt-blown fibers (MBF) according to claim 1, wherein a propylene copolymer (PP) as defined in claim 1, has been melt blown by using a melt blown plant having a die with holes of 0.3 to 0.5 mm diameter and 10 to 16 holes per cm.

12. Article comprising a melt-blown web (MBW) according to claim 8, said article is selected from the group consisting of filtration medium, diaper, sanitary napkin, panty liner, incontinence product for adults, protective clothing, surgical drape, surgical gown, and surgical wear.

* * * * *